United States Patent
Mizuno et al.

(10) Patent No.: US 8,457,009 B2
(45) Date of Patent: Jun. 4, 2013

(54) WIRELESS COMMUNICATION APPARATUS AND WIRELESS COMMUNICATION METHOD FOR DETECTING ELECTRIC FIELD INTENSITY OF WIRELESS CHANNEL, AND PROGRAM STORING MEDIUM

(75) Inventors: Kimiyasu Mizuno, Akishima (JP); Takehiro Aibara, Hamura (JP); Hitoshi Amagai, Fussa (JP); Naotaka Uehara, Higashimurayama (JP); Takayuki Kogane, Akishima (JP); Sumito Shinohara, Akiruno (JP); Masato Nunokawa, Fussa (JP); Tetsuya Handa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 355 days.

(21) Appl. No.: 12/814,594

(22) Filed: Jun. 14, 2010

(65) Prior Publication Data

US 2010/0322209 A1  Dec. 23, 2010

(30) Foreign Application Priority Data

Jun. 17, 2009 (JP) ................................. 2009-144433

(51) Int. Cl.
*H04W 4/00* (2009.01)
(52) U.S. Cl.
USPC ......................................... 370/252; 370/329
(58) Field of Classification Search
None
See application file for complete search history.

(56) References Cited

U.S. PATENT DOCUMENTS

| 7,509,097 | B2 | 3/2009 | Irie et al. |
| 7,948,934 | B2* | 5/2011 | Espina et al. ................. 370/328 |
| 2003/0214967 | A1* | 11/2003 | Heberling ..................... 370/437 |
| 2005/0054294 | A1* | 3/2005 | Khun-Jush et al. .......... 455/63.1 |
| 2005/0063372 | A1 | 3/2005 | Jeong et al. |
| 2006/0187961 | A1* | 8/2006 | Kai .............................. 370/469 |
| 2007/0091813 | A1* | 4/2007 | Richard et al. ............... 370/248 |
| 2008/0259860 | A1 | 10/2008 | Ohseki et al. |

FOREIGN PATENT DOCUMENTS

| JP | 2002-158667 A | 5/2002 |
| JP | 2003-151062 A | 5/2003 |
| JP | 2004-520766 A | 7/2004 |
| JP | 2006-229612 A | 8/2006 |
| JP | 2007-311851 A | 11/2007 |
| JP | 2008-252717 A | 10/2008 |
| JP | 2009-27725 A | 2/2009 |

* cited by examiner

*Primary Examiner* — Robert Scheibel
(74) *Attorney, Agent, or Firm* — Holtz, Holtz, Goodman & Chick, P.C.

(57) ABSTRACT

A wireless communication apparatus includes a communication unit and a control unit. The communication unit periodically transmits a beacon signal to wireless terminal devices existing in a network using a use channel selected from wireless channels and to detect electric field intensities of the wireless channels. The control unit detects, by the communication unit, the electric field intensities of the wireless channels in a predetermined communication limiting period in a period during which wireless communication with an unspecified wireless terminal device existing in the network is prohibited in a period in which the beacon signal is transmitted.

10 Claims, 4 Drawing Sheets

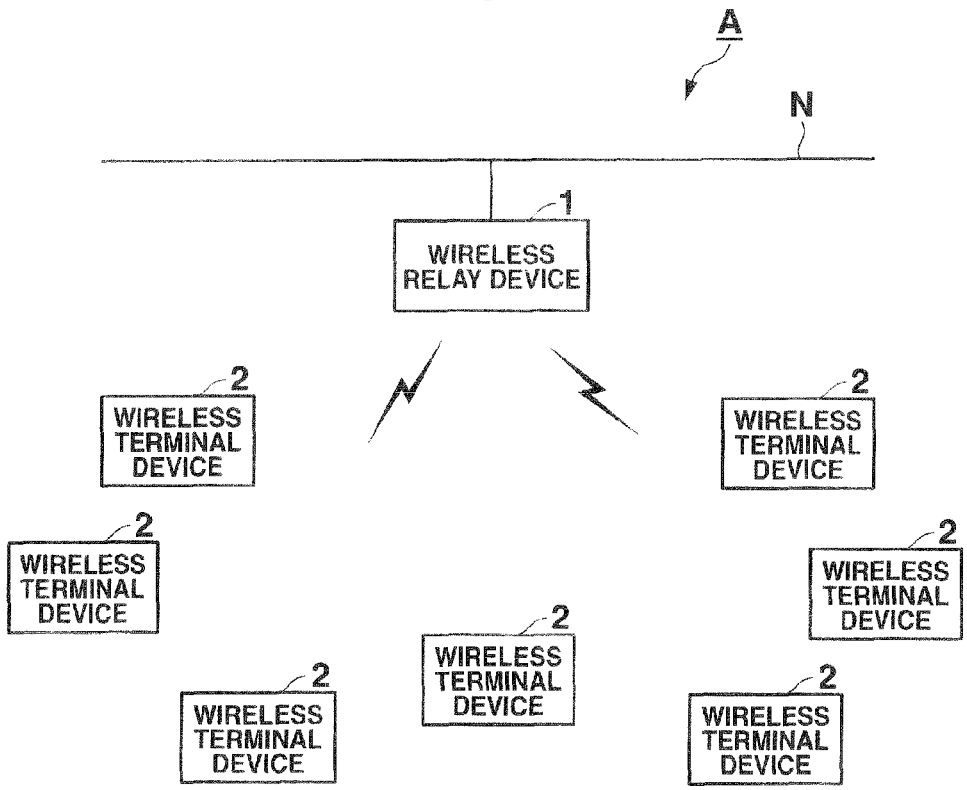
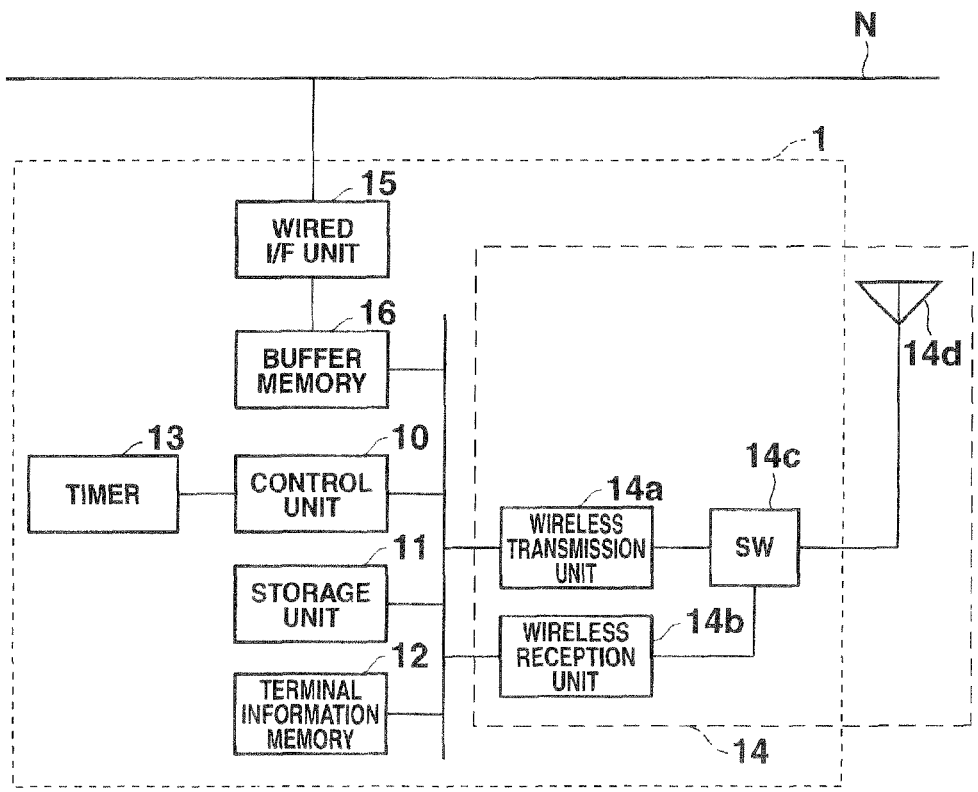

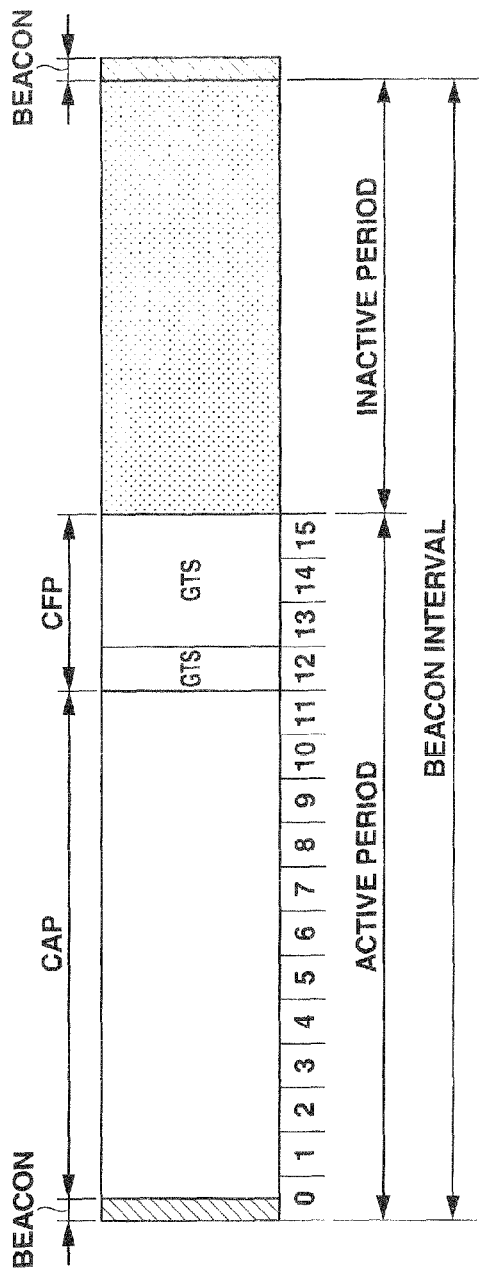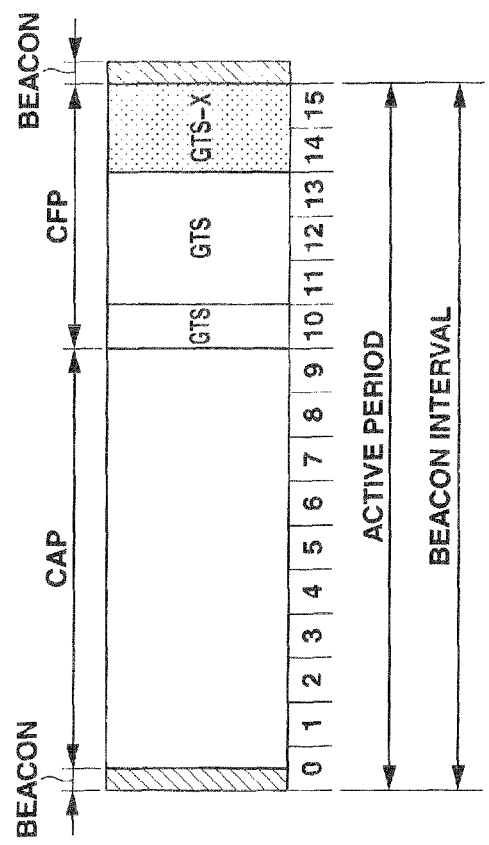

WIRELESS COMMUNICATION APPARATUS AND WIRELESS COMMUNICATION METHOD FOR DETECTING ELECTRIC FIELD INTENSITY OF WIRELESS CHANNEL, AND PROGRAM STORING MEDIUM

CROSS-REFERENCE TO RELATED APPLICATIONS

This application is based upon and claims the benefit of priority from prior Japanese Patent Application No. 2009-144433, filed Jun. 17, 2009, the entire contents of which are incorporated herein by reference.

BACKGROUND OF THE INVENTION

1. Field of the Invention

The present invention relates generally to a wireless communication apparatus and a wireless communication method for detecting electric field intensity of a wireless channel, and a program storing medium.

2. Description of the Related Art

In recent years, for example, a wireless communication system specified in, for example, IEEE 802.15.4 includes a wireless relay device (coordinator) as the center of a network, and a plurality of wireless terminal devices (end devices) existing in the network and performing wireless communication with the wireless relay device.

In such a wireless communication system, wireless communication is performed between the wireless relay device and the wireless terminal devices by using any one of a plurality of wireless channels. To realize stabilized communication environment, the wireless wave interference avoiding technique (for example, frequency agility) of dynamically switching a wireless channel to be used is employed. When using the wireless wave interference avoiding technique, the state of a wireless wave interference of a wireless channel has to be measured by an ED (Energy Detection) scan.

For example, Jpn. Pat. Appln. KOKAI Publication No. 2004-520766 discloses a technique of measuring the qualities of a plurality of wireless channels by a wireless terminal device on a network and collecting the measurement results in a wireless relay device. In such a technique, however, although the wireless wave condition of a wireless channel in the periphery of the wireless terminal device can be grasped, it is difficult to grasp the wireless wave condition of a wireless channel around the wireless relay device. In the wireless communication system, specified in IEEE 802.15.4, a wireless terminal device is usually in a sleep state. At an arbitrary timing when communication becomes necessary, the wireless terminal device wakes up and starts communication. Consequently, the wireless relay device has to remain in a standby state in order to receive data transmitted from a wireless terminal device at an arbitrary timing except when data is transmitted to the wireless terminal device. Therefore, even when a wireless relay device tries to measure a wireless wave condition of a wireless channel around the wireless relay device, it is difficult to distinguish whether the measurement result is an interference wireless wave or a wireless wave used in communication from a wireless terminal device on a network.

Jpn. Pat. Appln. KOKAI Publication No. 2002-158667 discloses a wireless network in which a master station transmits a monitor beacon that prohibits transmission from a slave station for a predetermined time, the slave station which receives the monitor beacon stops packet transmission for the designated period and measures intensity of received electric field during the period, and transmits the measurement result to the master station. According to the technique described in this publication, however, in a system that transmits data from a wireless relay device (master station) to a wireless terminal device (slave station), the wireless relay device forcedly stops data communication with the wireless terminal device to measure the electric field intensity. Consequently, it is not assumed that the technique is applied to a system where data communication starts in response to a request from a wireless terminal device. In the technique descried in the publication, the wireless relay device forcedly stops data communication with the wireless terminal device, so that data transmission/reception to/from the wireless terminal device cannot be performed during the stop period. There is consequently a problem that communication efficiency deteriorates.

Further, to measure the wireless wave interference condition of a wireless channel to avoid wireless wave interference, it is necessary to measure not only a wireless channel currently being used but also a wireless channel to which the wireless channel is switched. To measure a wireless channel to which the wireless channel currently being used is switched, the wireless relay device has to change the wireless channel currently being used to another wireless channel. However, the wireless relay device has to remain in a standby state in order to receive data transmitted from the wireless terminal device. It is difficult for the wireless relay device to change the wireless channel to another wireless channel.

Although there is a technique of providing the wireless relay device with a wireless unit dedicated to measure wireless wave interference, a problem occurs such that the cost increases.

BRIEF SUMMARY OF THE INVENTION

An object of the present invention is to measure wireless wave environment of a wireless channel in a state where communication is not performed on a network.

According to an embodiment of the present invention, a wireless communication apparatus comprises a communication unit configured to periodically transmit a beacon signal to wireless terminal devices existing in a network using a use channel selected from wireless channels and to detect electric field intensities of the wireless channels; and a control unit configured to detect, by the communication unit, the electric field intensities of the wireless channels in a predetermined communication limiting period in a period during which wireless communication with an unspecified wireless terminal device existing in the network is prohibited in a period in which the beacon signal is transmitted.

According to another embodiment of the present invention, there is provided a non-transitory computer readable medium storing a computer program to be executed by a computer. The program causes the computer to perform functions of periodically transmitting a beacon signal to wireless terminal devices existing in a network using a use channel selected from wireless channels; and detecting electric field intensities of the wireless channels in a predetermined communication limiting period in a period during which wireless communication with an unspecified wireless terminal device existing in the network is prohibited in period in which the beacon signal is transmitted.

According to another embodiment of the present invention, a wireless communication method comprises periodically transmitting a beacon signal to wireless terminal devices existing in a network using a use channel selected from wireless channels; and detecting electric field intensities of the wireless channels in a predetermined communication limiting period in a period during which wireless communication with an unspecified wireless terminal device existing in the network is prohibited in a period in which the beacon signal is transmitted.

Additional objects and advantages of the present invention will be set forth in the description which follows, and in part will be obvious from the description, or may be learned by practice of the present invention.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

FIG. 1 is a schematic configuration diagram of a wireless communication system according to an embodiment of the invention.

FIG. 2 is a schematic configuration diagram of a wireless relay device according to the embodiment of the invention.

FIG. 3A is a diagram showing an example of a superframe structure in the case where BO is larger than SO according to the embodiment of the invention.

FIG. 3B is a diagram showing an example of a superframe structure in the case where BO is equal to SO according to the embodiment of the invention.

DETAILED DESCRIPTION OF THE INVENTION

Figure 4:
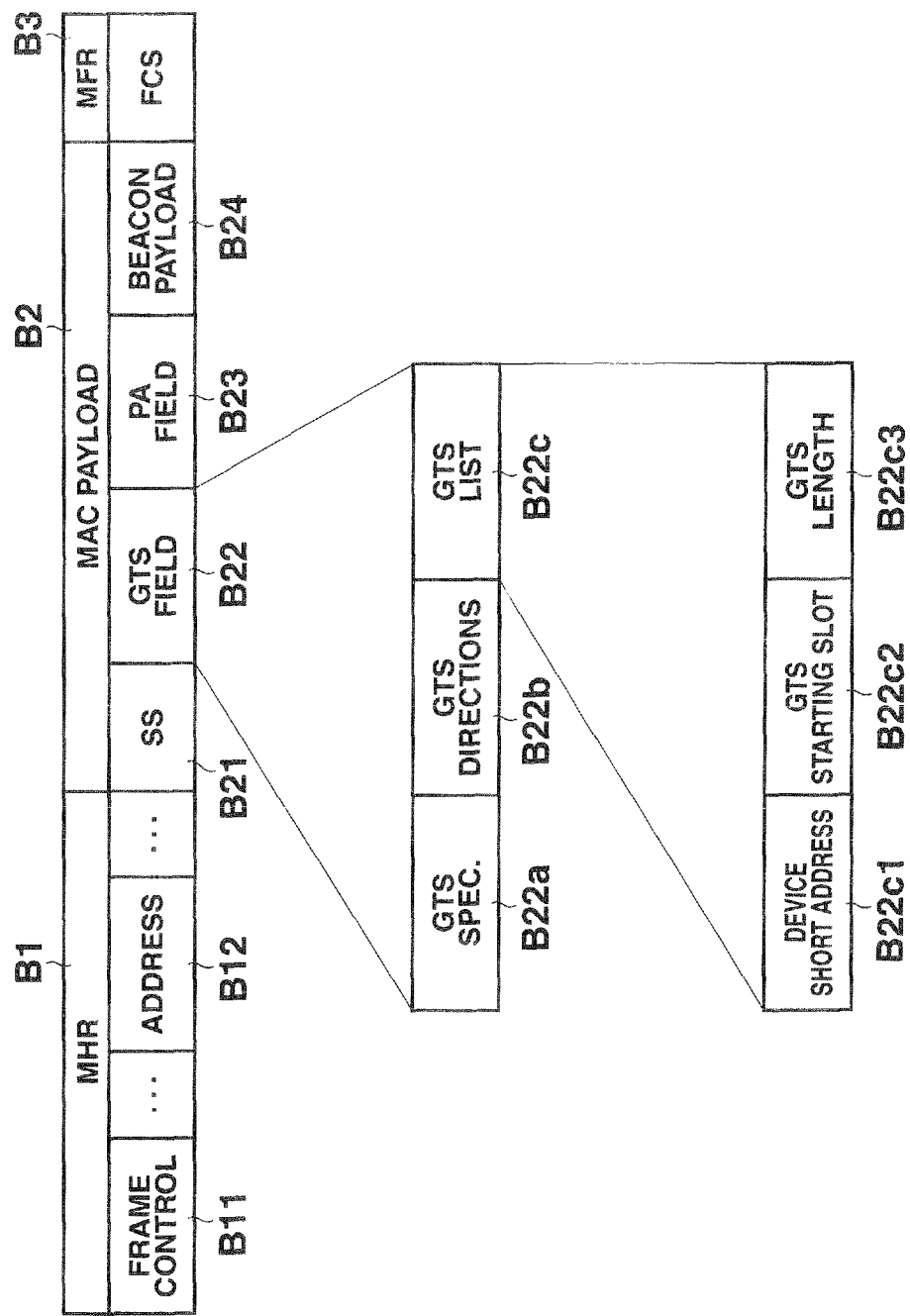
FIG. 4 is a diagram sowing an example of a beacon frame according to the embodiment of the invention.

The embodiments of the present invention will be explained in detail below, with reference to the attached drawings. The present invention is not limited to these embodiments, however. The terms of the invention are not limited to the ones adopted here.

The structure will be explained first.

FIG. 1 is a schematic block diagram of a wireless communication system A according to the first embodiment.

As shown in FIG. 1, the wireless communication system A includes a wireless relay device 1 connected to other wireless relay devices or external apparatuses by way of a communication network N and wireless terminal devices 2 wirelessly connected to the wireless relay device 1, and performs wireless communication in a beacon mode.

In the beacon mode, the wireless relay device 1 periodically and regularly transmits a beacon signal, and all of the wireless terminal devices 2 receive the beacon signal and operate synchronously with the received beacon signal. That is, in the beacon mode, a network using the wireless relay device 1 as a center is generated, and the wireless terminal devices 2 exist on the network.

As the wireless communication system A in the embodiment, a wireless PAN conforming to the standard of IEEE 802.15.4 is assumed. In this case, the wireless relay device 1 corresponds to a PAN coordinator, and the wireless terminal device 2 corresponds to a network device.

FIG. 2 is a schematic configuration diagram of the wireless relay device 1.

As illustrated in FIG. 2, the wireless relay device 1 comprises a control unit 10, a storage unit 11, a terminal information memory 12, a timer 13, a wireless communication unit 14, an interface (I/F) unit 15, a buffer memory 16, and the like, which are electrically connected to one another. The wireless communication unit 14 comprises a wireless transmission unit 14a, a wireless reception unit 14b, a switch (SW) 14c, and an antenna 14d.

The control unit 10 comprises a central processing unit (CPU), a read only memory (ROM), a random access memory (RAM), and the like. The control unit 10 reads designated programs, tables and data from various programs and various kinds of tables and data stored in the storage unit 11 and the terminal information memory 12. The control unit 10 expands the read-out programs, tables and data onto the RAM or the work area of the storage unit 11 or the terminal information memory 12, and executes various kinds of processing in cooperation with the programs. The control unit 10 stores the processing results into the RAM or a specific area of the storage unit 11 or the terminal information memory 12, and issues instructions to the units of the wireless relay device 1 to control the entire operation of the wireless relay device 1.

The control unit 10 reads a wireless communication environment measurement process program and various necessary data stored in the storage unit 11, terminal information and the like stored in the terminal information memory 12, and makes a wireless communication environment measuring process executed.

In the wireless communication environment measuring process, a communication limiting period is selected from cycles (beacon intervals) in which a beacon signal is transmitted. In the communication limiting period, the electric field intensities of a plurality of wireless channels are detected by the wireless reception unit 14b.

The communication limiting period is a predetermined period in a period during which wireless communication with an unspecified number of wireless terminal devices existing in the network is prohibited.

In the wireless communication environment measuring process, in the case where an inactive period (which will be described later) is included in the beacon interval, the inactive period is selected as the communication limiting period.

On the other hand, in the case where the inactive period is not included in the beacon interval, a wireless terminal device which does not exist in the network is assumed as a specific wireless terminal device. A virtual communication period during which wireless communication is performed with the assumed wireless terminal device (virtual wireless terminal device) is set, a beacon interval in which a contention-free period including the virtual communication period is included in an active period (which will be described later) is set, and the virtual communication period is selected as a communication limiting period.

In the standard of IEEE 802.15.4, as parameters for setting a beacon interval or the like, there are beacon order (BO) and superframe order (SO). The BO and SO have such a relation that BO is equal to or larger than SO. Based on BO and SO, a superframe structure is determined.

In an example of the superframe structure shown in FIG. 3A, BO is larger than SO. In an example of the superframe structure shown in FIG. 3B, BO is equal to SO.

As illustrated in FIGS. 3A and 3B, the superframe structure is a structure on the time base of determining a period during which a data frame can be transmitted.

The beacon interval is a period in which an active period and an inactive period can be included. In the case where BO is larger than SO, as shown in FIG. 3A, the beacon interval includes the active period and the inactive period. In the case where BO and SO are equal to each other, as shown in FIG. 3B, only the active period is included in the beacon interval.

The active period is a communication period during which the wireless terminal device and the wireless relay device existing in the network can perform wireless communication.

The inactive period is a stop period during which the wireless terminal device and the wireless relay device existing in the network do not perform wireless communication. In the inactive period, the entire network of performing wireless communication with the wireless terminal device using the wireless relay apparatus 1 as a center is set in a sleep mode, thereby reducing power consumption. That is, the inactive period is a period during which the wireless communication with an unspecified number of wireless terminal devices existing in the network is prohibited.

In the case where the inactive period is included in the beacon interval (in the case of FIG. 3A), the inactive period is selected as a communication limiting period.

The active period is made up of 16 slots obtained by dividing the active period into 16 pieces.

The active period can include a contention access period (CAP) made up of a plurality of slots, and a contention-free period (CFP) made up of seven slots at maximum.

The CAP denotes a period during which wireless communication can be performed with an unspecified number of wireless terminal devices existing in the network, and during which a plurality of wireless terminal devices existing in the network conflict to obtain the right to access a wireless channel (use channel) used by the wireless relay device.

The CFP denotes a period during which wireless communication is performed with a specific wireless terminal device existing in the network and dedicated GTS (Guaranteed Time Slots) are set to specific wireless terminal devices. The GTS is one or plural slots in the CFP, which is assigned, according to a request from a wireless terminal device, to the specific wireless terminal device which has sent the request.

During the GTS, wireless terminal devices except for the specific wireless terminal device to which the GTS has been assigned are prohibited from performing wireless communication with the wireless relay device. Consequently, the specific wireless terminal device to which the GTS has been assigned can perform communication in which a band is guaranteed with the wireless relay device. The CFP in which the GTS is set for each wireless terminal device is a period during which wireless communication with an unspecified number of wireless terminal devices existing in the network is prohibited.

In the embodiment, as shown in FIG. 3B, the inactive period is not included in the beacon interval and the beacon interval and the active period are equal to each other. GTS (virtual communication period (GTS-X in FIG. 3B)) of the virtual wireless terminal device is set in the CFP, and the virtual communication period is selected as the communication limiting period. By setting the virtual communication period, the number of slots assigned to the CAP decreases, and the beacon interval in which the CFP including the virtual communication period is included in the active period is set.

FIG. 4 shows an example of a beacon frame in the embodiment.

As shown in FIG. 4, a beacon signal includes an MHR (MAC (Media Access Control) header) region B1, an MAC payload region B2, and an MFR (MAC Footer) region B3.

The MHR region 51 includes a frame control region B11 and an address region B12. The MAC payload region B2 includes an SS (Superframe Specification) 521 storing SO and BO, a GTS field B22, a PA (Pending Address) field B23, and a beacon payload B24.

The GTS field B22 includes a GTS specification B22a, GTS directions 822b, and a GTS list B22c. The GTS list B22c includes a device short address B22c1, a GTS starting slot B22c2, and a GTS length B22c3. The device short address B22c1 stores an address (node address) indicative of a specific wireless terminal device using the GTS.

The storage unit 11 is formed of a non-volatile memory such as a magnetic recording medium and an optical recording medium and a semiconductor in which data can be electrically erased and rewritten, and the storage unit 11 is fixed to or detachably arranged in the wireless relay device 1. The storage unit 11 stores in advance various programs to be executed by the control unit 10 and various tables, data, field intensity tables and the like that are to be used in these programs.

The terminal information memory 12 is formed of a memory in which data can be electrically erased and rewritten. The terminal information memory 12 stores terminal information such as node addresses representing information specific to each of the wireless terminal devices 2 that are connected to the wireless relay device 1.

The timer 13 counts a beacon interval and outputs a beacon transmission timing signal indicating that count time reaches a transmission interval (beacon transmission timing) to the control unit 10. The timer 13 also counts an active period in the beacon interval, a start timing of each GTS, an end timing of each GTS, and the like, and outputs the timer signal to the control unit 10.

The wireless transmission unit 14a comprises a modulation circuit, a radio frequency (RF) circuit and the like. The unit 14a adjusts packet transmission power. It also creates a packet by encoding transmission data in accordance with an instruction from the control unit 10, modulates the created packet, and transmits the packet to the wireless terminal device 2 by way of the antenna 14d.

The wireless reception unit 14b comprises a demodulation circuit, an RF circuit and the like. The unit 14b adjusts the packet reception sensitivity, and it also demodulates the packet received by way of the antenna 14d and outputs to the control unit 10 the data that is obtained by analyzing the demodulated packet.

The SW 14c is arranged between the antenna 14d and the section of the wireless transmission unit 14a and the wireless reception unit 14b so that switching can be performed among the units connected to the antenna 14d (the wireless transmission unit 14a and the wireless reception unit 14b) in accordance with an instruction issued by the control unit 10.

The antenna 14d transmits packets based on a set transmission power, receives packets based on a set reception sensitivity, and detects an electric field intensity of a set wireless channel.

By the wireless transmission unit 14a, the wireless reception unit 14b, the SW 14c, and the antenna 14d, a communication unit is realized which performs a wireless communication of periodically transmitting a beacon signal to a plurality of wireless terminal devices existing in a network by using any one of a plurality of wireless channels and detects the electric field intensities of a plurality of wireless channels.

The I/F unit 15 performs communication control for performing communication with the other wireless relay devices 1 or external apparatuses connected via the communication network N by a predetermined communication method.

The buffer memory 16 temporarily stores data received via the I/F unit 15.

Next, the operation of the embodiment will be described.

Figure 5:
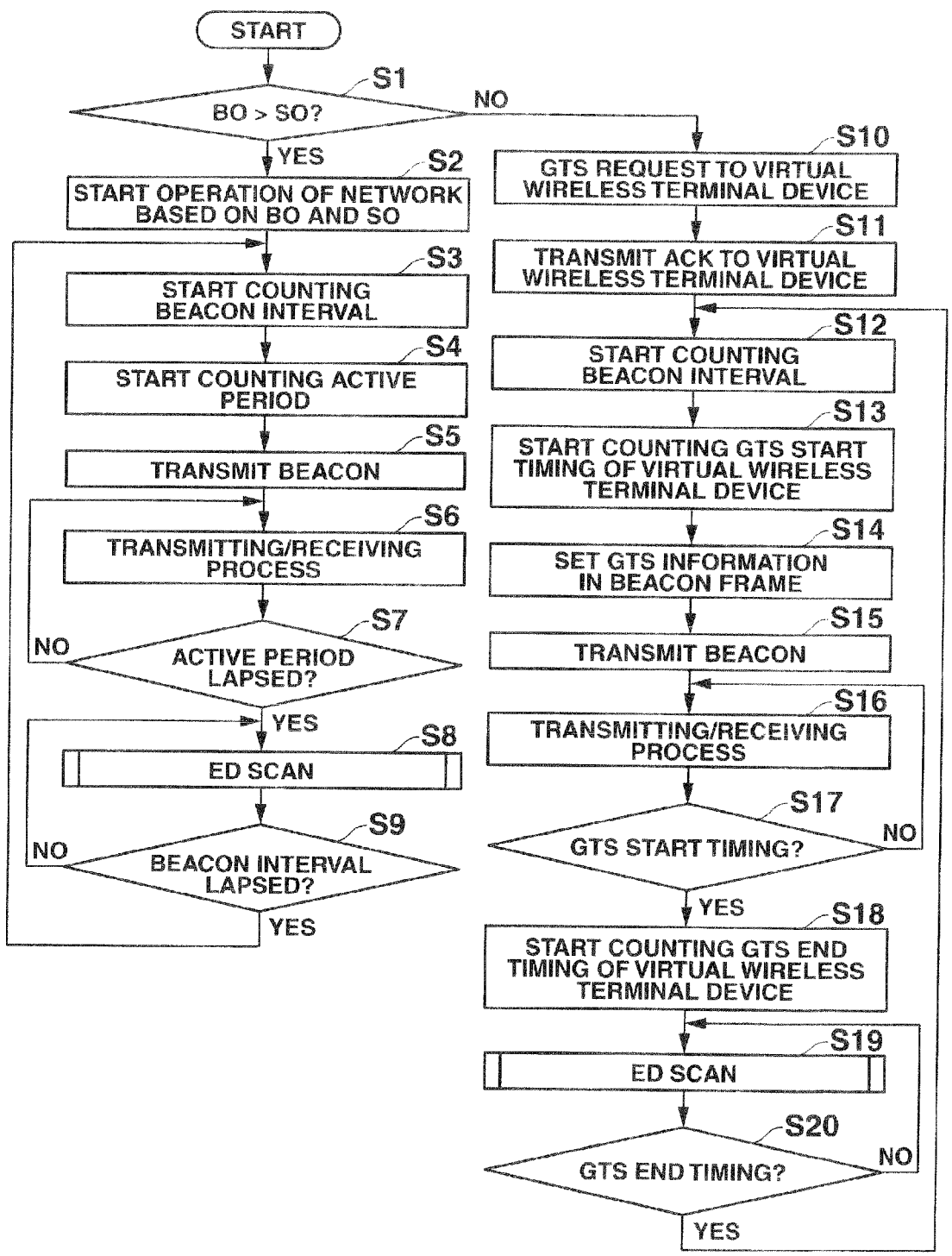
FIG. 5 is a flowchart of wireless wave environment measuring process executed in the wireless relay device according to the embodiment of the invention.

FIG. 5 is a flowchart of wireless communication environment measuring process executed by the wireless relay device 1. The process shown in FIG. 5 is executed in cooperation with the control unit 10 and the other units in the wireless relay device 1 as needed while power is supplied to the wireless relay device 1.

The control unit 10 determines whether a set BO is larger than an SO or not (step S1). In the case where the BO is larger than the SO (YES in step S1), the control unit 10 sets a beacon interval including an inactive period based on the BO and SO and starts operation of the network (step S2). The control unit 10 selects the inactive period as a communication limiting period.

The control unit 10 causes the timer 13 to start counting the beacon interval (step S3) and start counting the active period (step S4) and causes the wireless transmission unit 14a to transmit a beacon signal (step S5).

In step S5, a beacon signal is generated. Using any one of the plurality of wireless channels, the beacon signal is transmitted by the wireless transmission unit 14a.

After transmission of the beacon signal, the control unit 10 executes the transmission/reception process (step S6) and determines whether the time counted by the timer 13 exceeds the active period or not (step S7). In step S7, it is determined whether it is or not the inactive period start timing as the start timing of the communication limiting period.

In step S6, in the case where a data request signal transmitted in response to the transmitted beacon signal from the wireless terminal device 2 is received by the wireless reception unit 14b, an ACK signal and a data signal are transmitted from the wireless transmission unit 14a to the wireless terminal device 2 which has transmitted the data request signal, and an ACK signal to the data signal is received by the wireless reception unit 14b.

In the case where the active period has not elapsed (NO in step S7), the control unit 10 returns to the process in step S6. After lapse of the active period, that is, at the inactive period start timing (YES in step 37), the control unit 10 executes an ED scan (step S8).

In the ED scan executed in step S8, for example, the electric field intensity of the use channel is detected by the wireless reception unit 14b. In the case where the electric field intensity of the use channel is equal to or larger than a preset threshold, the control unit 10 determines that the wireless communication environment of the use channel deteriorates. The electric field intensities of wireless channels other than the use channel are detected, and the use channel is changed to a wireless channel whose electric field intensity is relatively low including a wireless channel whose detected electric field intensity is the lowest as a new use channel.

The control unit 10 determines whether the time counted by the timer 13 has exceeded the beacon interval or not (step S9). That is, in step S9, it is determined whether it is or not the end timing of the inactive period as the end timing of the communication limiting period.

In the case where the beacon interval has not elapsed (NO in step S9), the control unit 10 returns to the process in step S8. That is, the ED scan is executed during the inactive period.

After lapse of the beacon interval, that is, at the inactive period end timing (YES in step S9), the control unit 10 returns to the process in step S3.

In the case where the BO is not larger than the SO, that is, in the case where the BO is equal to the SO (NO in step S1), the control unit 10 makes the wireless relay device 1 itself look like a wireless terminal device (virtual wireless terminal device) which does not exist in the network, and transmits a signal requesting a GTS (GTS request signal) to the wireless relay device 1 itself (step S10). In step S10, the control unit 10 sets an address of the wireless terminal device (virtual wireless terminal device) which does not exist in the network and transmits a GTS request signal including the address.

When the GTS request signal is received by the wireless reception unit 14b, the control unit 10 sets a GTS (virtual communication period) to which a slot of performing wireless communication exclusively with the wireless terminal device which has sent the GTS request signal, that is, a virtual wireless terminal device is assigned. Based on the BO and the SO, the control unit 10 sets a beacon interval in which the GTS (virtual communication period) of the virtual wireless terminal device is set in the CFP in the active period without including the inactive period, and starts the operation of the network. The control unit 10 also selects the virtual communication period as the communication limiting period.

After selection of the communication limiting period, the control unit 10 transmits the ACK signal from the wireless transmission unit 14a to the virtual wireless terminal device (step S11).

After step S11, the control unit 10 causes the timer 13 to start counting the beacon interval (step S12) and start counting the start timing of the GTS (virtual communication period) of the virtual wireless terminal device selected as the communication limiting period (step S13).

The timing of starting the virtual communication period is calculated based on the number of slots from zero at which the beacon interval starts to the slot assigned to the virtual wireless terminal device.

The control unit 10 sets the GTS information in a beacon frame (step S14) and causes the wireless transmission unit 14a to transmit the beacon signal (step S15).

In step S14, the information of the GTS (virtual communication period) of the virtual wireless terminal device (for example, the address of the virtual wireless terminal device, the start slot number, the number of slots, and the like is set. However, information of the GTS of another wireless terminal device which has sent a request may be set in the beacon frame.

After transmission of the beacon signal, the control unit 10 executes the transmitting/receiving process (step S16) and determines whether or not time counted by the timer 13 has reached the timing of starting the GTS (virtual communication period) of the virtual wireless terminal device (step S17). Since the transmitting/receiving process in step S15 is similar to that in step S6, the description thereof will not be repeated.

When it is not the timing of starting the virtual communication period (NO in step S17), the control unit 10 returns to the process in step S16. When it is the timing of starting the virtual communication period (YES in step S17), the control unit 10 causes the timer 13 to start counting the end timing of the GTS (virtual communication period) of the virtual wireless terminal device (step S18).

The end timing of the virtual communication period is calculated based on the number of slots assigned to the virtual wireless terminal device.

After step S18, the control unit 10 executes an ED scan (step S19).

The ED scan of step S19 is similar to that of step S8. For example, the electric field intensity of the use channel is detected by the wireless reception unit 14b. In the case where the electric field intensity of the use channel is equal to or larger than a preset threshold, the control unit 10 determines that the wireless communication environment of the use channel deteriorates. The electric field intensities of wireless channels except for the use channel are detected, and the use channel is changed to a wireless channel whose electric field intensity is relatively low including a wireless channel whose detected electric field intensity is the lowest as a new use channel.

The control unit 10 determines whether the time counted by the timer 13 is the end timing of the GTS (virtual communication period) of the virtual wireless terminal device or not (step S20). If it is not the end timing of the virtual communication period (NO in step S20), the control unit 10 returns to the process in step S19. That is, the ED scan is executed during the virtual communication period.

At the end timing of the virtual communication period (YES in step S20), the control unit 10 returns to the process in step S12.

In this manner, the wireless communication apparatus is realized by the wireless relay device 1 executing the wireless wave environment measuring process.

According to the embodiment, a predetermined period (the inactive period or the virtual communication period) in the period during which wireless communication with an unspecified wireless terminal device existing in the network is prohibited (inactive period and CFP) in the beacon interval is selected as the communication limiting period, and the electric field intensities of a plurality of wireless channels are detected by the wireless reception unit 14b during the communication limiting period. Consequently, it is not necessary to separately provide an apparatus dedicated to measure the wireless communication environment, and the wireless communication environment of a wireless channel can be measured in a state where communication is not performed on a network.

As the communication limiting period, in the case where the BO is larger than the SO, that is, in the case where the beacon interval includes the inactive period during which the wireless communication is not performed with a wireless terminal device existing in the network, the inactive period can be selected as the communication limiting period.

In the inactive period, the entire network is in a sleep state, and no communication from the wireless terminal device exists. Consequently, all of the electric field intensity detected in the inactive period is of interference wave.

In the inactive period, wireless communication between the wireless relay device and the wireless terminal device is not performed. Therefore, there is no influence of communication failure caused by changing a wireless channel used. Thus, the wireless channel used in the communication unit 14 can be changed and the electric field intensity of another wireless channel can be measured.

In the case where the beacon interval does not include the inactive period, a virtual communication period of performing wireless communication on a virtual wireless terminal device which does not exist in the network is set in the CFP, and the virtual communication period can be selected as the communication limiting period.

Since the virtual communication period set in the CFP is a communication period dedicated to a virtual wireless terminal device which does not exist in a network, in practice, no wireless communication is performed in the network during the virtual communication period. Consequently, all of the electric field intensity detected in the virtual communication period is of the interference wave.

Since no wireless communication is performed in the virtual communication period, there is no influence of communication failure caused by changing a wireless channel used. Thus, the wireless channel used in the communication unit 14 can be changed and the electric field intensity of another wireless channel can be measured.

Although the inactive period or the virtual communication period is set as the communication limiting period based on the relation between SO and BO in the embodiment, the communication limiting period may be provided according to a protocol. For example, a predetermined time immediately after transmission of a beacon signal may be determined as a period of prohibiting wireless communication by the wireless relay device and the wireless terminal device, and the period may be regarded as the communication limiting period. In this case, in a predetermined time immediately after transmission of the beacon signal, the electric field intensity of a wireless channel is detected.

Although the system conforming to the standard of IEEE 802.15.4 has been described as an example in the embodiment, the invention can be also applied to another wireless communication method.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A wireless communication apparatus configured to communicate with a wireless communication terminal via a use channel which is one of a plurality of wireless channels, in a network conforming with IEEE 802.15.4, the apparatus comprising:
   detecting means for detecting electric field intensities of the wireless channels;
   comparing means for comparing a beacon order with a superframe order;
   first communication limiting period setting means for setting a part of a guaranteed time slot as a communication limiting period, during which wireless communication with any wireless communication terminal in the network is prohibited, if the beacon order is equal to the superframe order; and
   control means for causing the detecting means to detect the electric field intensities of the wireless channels in the communication limiting period.

2. The wireless communication apparatus according to claim 1, further comprising:
   second communication limiting period setting means for setting an inactive period as the communication limiting period if the beacon order is larger than the superframe order.

3. The wireless communication apparatus according to claim 2, wherein the first communication limiting period setting means sets a beacon interval comprising a communicable period during which wireless communication is performed with a wireless communication terminal existing in the network, wherein the communicable period comprises a contention-free period comprising a virtual communication period during which wireless communication is performed with a virtual wireless terminal device which does not exist in the network.

4. The wireless communication apparatus according to claim 3, wherein the control means changes the use channel to a wireless channel whose electric field intensity is lower than an electric field intensity of another wireless channel if a wireless communication environment deteriorates.

5. The wireless communication apparatus according to claim 2, wherein the control means changes the use channel to a wireless channel whose electric field intensity is lower than an electric field intensity of another wireless channel if a wireless communication environment deteriorates.

6. The wireless communication apparatus according to claim 1, wherein the first communication limiting period setting means sets a beacon interval comprising a communicable period during which wireless communication is performed with a wireless communication terminal existing in the network, wherein the communicable period comprises a contention-free period comprising a virtual communication period during which wireless communication is performed with a virtual wireless terminal device which does not exist in the network.

7. The wireless communication apparatus according to claim 6, wherein the control means changes the use channel to a wireless channel whose electric field intensity is lower than an electric field intensity of another wireless channel if a wireless communication environment deteriorates.

8. The wireless communication apparatus according to claim 1, wherein the control means changes the use channel to a wireless channel whose electric field intensity is lower than an electric field intensity of another wireless channel if a wireless communication environment deteriorates.

9. A wireless communication apparatus configured to periodically transmit a beacon to a wireless communication terminal via a use channel which is one of a plurality of wireless channels, in a network conforming with IEEE 802.15.4, the apparatus comprising:
    detecting means for detecting electric field intensities of the wireless channels;
    determining means for determining whether a beacon interval comprises an inactive period during which the wireless communication apparatus does not communicate with a wireless communication terminal existing in the network;
    first communication limiting period setting means for setting a part of a guaranteed time slot as a communication limiting period, during which wireless communication with any wireless communication terminal in the network is prohibited, if the beacon interval does not comprise the inactive period; and
    control means for causing the detecting means to detect the electric field intensities of the wireless channels in the communication limiting period.

10. A non-transitory computer readable storage medium having a program stored thereon which is executable by a wireless communication apparatus, the wireless communication apparatus being configured to communicate with a wireless communication terminal via a use channel which is one of a plurality of wireless channels, in a network conforming with IEEE 802.15.4, the program controlling the wireless communication apparatus to perform functions comprising:
    comparing a beacon order with a superframe order;
    setting a part of a guaranteed time slot as a communication limiting period, during which wireless communication with any wireless communication terminal in the network is prohibited, if the beacon order is equal to the superframe order; and
    performing control to detect electric field intensities of the wireless channels in the communication limiting period.

* * * * *